United States Patent [19]

Bernardo

[11] Patent Number: 5,251,950
[45] Date of Patent: Oct. 12, 1993

[54] ROLLING COVER FOR A TRUCK UTILITY BED HAVING IMPROVED REEL SUPPORT HOUSING AND GUIDE TRACK CLAMPS

[76] Inventor: Richard G. Bernardo, 2350 NE. 29th St., Lighthouse Point, Fla. 33064

[21] Appl. No.: 922,745

[22] Filed: Jul. 30, 1992

[51] Int. Cl.⁵ .............................................. B60J 7/10
[52] U.S. Cl. ..................................... 296/98; 296/100
[58] Field of Search ................................. 296/98, 100

[56] References Cited

U.S. PATENT DOCUMENTS

| | | | |
|---|---|---|---|
| 4,730,866 | 3/1988 | Nett | 296/100 |
| 4,786,099 | 11/1988 | Mount | 296/98 |
| 4,807,921 | 2/1989 | Champie, III et al. | 296/98 |
| 5,040,843 | 8/1991 | Russell et al. | 296/98 |
| 5,152,574 | 10/1992 | Tucker | 296/100 |

*Primary Examiner*—Robert R. Song

*Attorney, Agent, or Firm*—Malin, Haley, DiMaggio & Crosby

[57] ABSTRACT

An improved rollable truck bed cover for securely covering a pickup truck utility bed that can be quickly mounted to existing truck beds without structural modification of the truck bed by adjustable guide track mounting clamps. The cover employs a pair of elongated guide tracks attached to the bed rail sidewalls by the use of clamps that engage the side surface of the truck bed without drilling or otherwise affecting the integrity of the truck finish. The adjustable guide track clamps are placed beneath the sidewall bed lip wherein tightening of the clamp places a upward pressure on the underside of the truck bed rail lip while placing a downward pressure on a support clamp essentially squeezing the sidewall lip securely attaching the guide track. A cover housing with reel is also clamped to the truck bed rails.

15 Claims, 6 Drawing Sheets

ROLLING COVER FOR A TRUCK UTILITY BED HAVING IMPROVED REEL SUPPORT HOUSING AND GUIDE TRACK CLAMPS

BACKGROUND OF THE INVENTION

1. Field of the Invention

This invention relates generally to an apparatus for covering a truck utility bed and, in particular, to an improved, easily installable, slatted, rolling cover for securely covering a truck utility bed without truck bed modification. The invention includes an improved reel support housing and guide track clamp for ease in installation.

2. Description of the Prior Art

Numerous types of truck bed covers are commonly used over the utility bed portion of a pickup truck to protect the bed and items placed therein. By securing a cover to bed rails of the truck bed, an enclosure is formed capable of protecting items placed therein against theft and exposure to the elements. The cover may sometimes provide an aerodynamic profile enhancing gasoline mileage, dependant upon the overall shape and profile.

Well known in the art are coverings made from cloth, canvas, vinyl, or similar flexible fabrics providing an inexpensive construction. The coverings are generally attached to the truck bed by use of buckles, snaps, or other like tie downs or fasteners permanently mounted on the bed rail areas. Some utilize conventional clamps as a tie down. A disadvantage to such coverings is that the only security provided is in the form of concealing items beneath the cover. Such security may be defeated by simply releasing the cover or cutting the fabric. In addition, flexible coverings often shrink, fade, or otherwise wear out necessitating periodic replacement. Further, the tie downs or fasteners which are permanently anchored to the truck bed require a replacement cover to use the exact tie down locations.

Another type cover is the fiberglass or metal enclosure (camper top) providing a raised roof over the truck bed. Such an enclosure provides a large storage area but limits the use of the truck to items that will fit within the enclosure or through its access door as the enclosure is permanently bolted or clamped to the truck bed. Access to areas of the bed is limited to the tailgate area and is inconvenient for many applications.

Retractable or rolling covers mounted on a roll-up reel mechanism are also known for their ability to cover the utility bed of a pickup truck. The roll up covering is an adaptation of the vertical shutters used by homeowners to cover windows for protection against storms and burglars. A rolling cover is typically comprised of elongated plastic or aluminum slats hinged together along their top and bottom edges and disposed between a pair of parallel spaced guide tracks permanently anchored to each side of the utility bed opening. One end of the cover is connected to a spring-loaded reel about which the cover can be rolled, manually. A disadvantage to the adaptation is that the roller cover of the prior art is susceptible to dynamic vibrations and the horizontal disposition of the slats and tracks often results in lateral shifting or downward forces causing jamming during opening and closing, rattling of components, and water leakage through the shutters.

A major disadvantage to both fabric and roller coverings of the prior art is the method of mounting required for permanent anchoring to the truck bed. For fabric coverings, the tie downs are most often permanently attached to the truck bed in order to secure the covering from lifting due to the wind. The tie down attachments or button fasteners are achieved by drilling a plurality of holes into the truck bed rails. Such holes are irreversible and destroy the integrity of the painted surface exposing the body to rust and otherwise distracting from the overall appearance of the truck. Similar bed modifications are required with slatted rolling covers of the prior art resulting in higher costs and irreversible damage to the truck. Various types of slatted truck bed covers are known in the prior art.

U.S. Pat. No. 4,889,381 issued to Tamblyn discloses the use of a retractable truck bed cover employing a rolling cover. Tamblyn exemplifies the prior art by disclosing a device that is permanently attached to the truck bed requiring a plurality of holes to be cut through the truck finish.

U.S. Pat. No. 4,807,921 issued to Champie discloses a sliding cover for truck beds also disclosing running tracks permanently anchored to the truck bed.

U.S. Pat. No. 4,784,427 issued to Burgess discloses a tension wound cover for maintaining truck roller slats in a rigid position addressing jamming of the shutters during the opening or closing thereof. Burgess employs a rail which permanently attaches to the truck for securing of the cover. The cover reel housing for storage is bulky and protrudes awkwardly upward beneath the cab rear window.

The installation of a conventional rolling truck bed cover is costly, time consuming, and requires permanent structural modifications to the bed rail. Thus, the use of a prior art cover can limit truck resale value as the purchaser must be willing to accept the covering device or the alterations to the truck bed after removal of the cover. If the cover remains with the truck, improperly treated attachment holes in the bed is a source of metal degradation that will also lower the value of the truck.

The instant invention addresses the aforementioned problems by providing a rolling cover system for a truck utility bed having guide tracks that are attachable to a pickup truck bed with a secure visually hidden clamping system without placing holes or other irreversible modifications in the side walls of the truck bed. In addition, the improved cover system provides for a modular and easy to install reel support housing that cooperates with the guide tracks for jam free operation. It is, therefore, to the effective resolution of these needs and problems associated therewith that the present invention is directed.

SUMMARY OF THE INVENTION

An apparatus for use in covering a conventional truck utility bed comprising a plurality of rigid slats joined together longitudinally in a hinged side by side array and movably attached to a pair of elongated guide tracks disposed in parallel relation to one another and clamped to the bed rails of a conventional truck utility bed. The cover body formed by the slats is attached at one end to a roll up reel, mounted in a reel support housing attached by a clamp system to the front end of the truck bed. The cover body can be manually rolled up and stored in the reel housing or manually extended over the truck bed opening along the guide tracks, and includes an actuating spring. Each guide track has a horizontally disposed U-shaped channel with an upper and lower plastic runner/bearing surface. The guide tracks overlap on each side over the top of the pickup bed rails providing a substantially horizontal flange for aligning the guide track.

Three or four bolt-actuated guide track mounting clamp assemblies securely attach each guide track to its respective bed rail on each side. Each guide track is bolted to at least three clamp assemblies per side which grasp the truck bed rail by bearing upon and seizing the horizontal wall of the truck bed rail while straddling the truck bed rail downwardly facing lip. This attachment to each bed rail by straddling the bed rail lip and clamping only to the bed rail horizontal wall permits lateral adjustment of the guide tracks, whereby the guide tracks are accurately parallel regardless of truck bed rail inconsistencies.

Each guide track mounting clamp assembly is comprised of two interlocking inner and outer facing C-shaped pieces, bolted together, one piece of which is secured to the back of the guide track, with top and bottom flanges of the inner C-shaped piece facing outwardly toward the outside of the truck bed, allowing its top flange having a rubber pad to rest upon the top horizontal wall segment of the bed rail, while its bottom flange passes under the downward facing lip of the bed rail. The inner C-shaped piece also has another rubber pad midway that contacts a vertical wall segment of the bed rail. The outer C-shaped clamp piece is positioned under the bed rail with top and bottom flanges facing inwardly toward the center of the truck bed allowing its top flange to press upon the underside of the horizontal wall segment of the bed rail, while the lower flange is interlocked with the lower flange of the inner C-shaped piece. The clamping force of the clamp assembly to the horizontal wall of the bed rail is achieved by tightening a bolt which passes through a clearance hole in the lower flange of the outer clamp piece into a threaded hole in the lower flange of the inner clamp piece. Rotating (tightening) this bolt forces the outer clamp piece to move upwardly, creating an upward pressure on the horizontal wall of the truck bed rail while the corresponding upper flange of the inner clamp piece creates a downward pressure on the horizontal wall of the bed rail because the bed rail is positioned between the upper flanges of both clamp pieces. Angularity or planar disposition of the guide track is adjustably controlled by properly positioning and holding each guide track while tightening each clamp bolt. Further subtle adjustments can be achieved by adjusting an angularity adjustment bolt which is located on the vertical wall of the outer clamp piece that ensures proper alignment of the guide track to the bed rail.

The moveable cover body is comprised of a plurality of elongated rectangular slats hinged movably in a side by side array having arcuate male and female connectors along the longitudinal edges which interlock adjacent slats together providing an impervious surface in a closed position. Each slat is constructed of extruded aluminum and includes an elongated vinyl seal member in each arcuate slat connector to protect against water entry.

A slat end retainer constructed of molded plastic is placed at each end of the slat for contact with the guide track on both sides. Each slat end retainer has a projecting stem sized in length, width, thickness and contour to fit into the inside of the slat for a snug fit and to provide a similar exterior profile for proper movement of the slat ends in the guide track. Also, each end retainer is anchored to a slat by rivets. An end cap portion of the slat end retainer body is integrally formed with the stem forming a peripheral rim for securing an adjoining slat in alignment with a holding slat, thereby preventing lateral movement between slats. Arcuate shape slat end retainers allow simplified (non jam) closure and opening by providing a curvature to accommodate proper clearance and a support of each slat as each slat transitions through and into the entrance to the guide rail passageway. Upper and lower plastic guide runners mounted in the guide tracks frictionally engage the lower surface of each slat and limit upward movement providing non metal contact to reduce or eliminate noise.

The cover body is rolled up when desired on a spring actuated reel, mounted in a compact storage reel housing for the slats of the rolling cover, the reel supported by two uniquely configured end plates that act as reel supports (one left, one right), each end plate having a main vertically disposed rigid metal wall and a horizontally projecting flange which seats upon the truck bed rail thereby supporting the reel, slats and a reel housing at the cab end of the truck bed. Each end plate horizontal flange also includes an integrally formed perpendicular vertical flange extending in an upward direction from its outermost edge which acts as an attaching flange for the reel housing lid. The reel housing lid includes downward facing end flanges that overlap the upward facing flange of both left and right reel support end plates. The upward facing flanges of the left and right reel support plates include threaded bushings to receive screws which attach through corresponding holes in the downward facing end flanges of the housing lid. An integral multi-walled housing bolts to the end plates forming an enclosure completed by the lid. The horizontally projecting flange of each reel support end plate also contains a specially positioned hole which receives a bolt that passes through the hole, bypassing the inside edge of the bed rail and threading into a bracket which extends from the main vertically disposed wall of the reel support to a point substantially under the bed rail of the truck. When the bolt is tightened, the end plate bracket, which is prevented from rotating due to the flat surface of its inward facing edge bearing against the main outside surface of the vertically disposed wall of the reel support end plate, moves upward clamping the horizontal wall of the bed rail between itself and the horizontally outward facing flange of the reel support end plate. The entire housing assembly is thereby clamped securely to the bed rail of the truck in a manner similar to the guide tracks.

Included as part of each reel support end plate is an attaching tab which projects beyond the front edge of the main vertically disposed wall of the reel support end plate in the direction of the tailgate. This tab has been stamp-formed so as to be offset (recessed) from the plane of the main vertically disposed wall of the reel support plate an amount equal to the thickness of the inner vertical wall and lower flange of the side guide track so as to allow the guide track to engage and attach to the reel support end plate while maintaining the inside face of the main vertical wall of the reel support end plate and the inner vertical wall of the guide track in a common plane. The offset tab also includes an attaching hole which corresponds to a hole in a corresponding flange of the guide track assuring perfect alignment of reel support and track when secured by bolt and nut. This flush relationship between reel support end plate and each guide track contributes to the smooth transition of the cover body slat end between the storage (closed) position and the open position as the slat ends move into and out of the guide track.

Another feature of each reel support end plate is its perimeter flanges which are positioned on the front, bottom and back edges of the main vertically disposed wall and are formed in a right angle relationship to the main vertically disposed wall for the purpose of providing an attaching surface for the reel housing walls which may be a single piece metal unit having a floor and vertical front and rear walls. The reel housing walls which terminate exactly flush with the outside face of each vertically disposed reel support plate is secured by rivets or screws to these perimeter flanges.

Accordingly, it is an object of this invention to provide an improved slatted rollable truck bed cover that is easily and quickly installed onto existing conventional truck utility beds without structurally modifying the truck bed.

Another object of the instant invention is to provide an improved rolling truck bed cover having a sturdy, easily mounted reel support housing, accurate and sturdy connection of the guide tracks to the truck bed rails, and easy installation of the reel housing assembly to the truck bed rails.

Yet another object of the instant invention is to provide an improved roll up slatted truck bed cover that can be installed quickly on existing pickup truck beds using the truck sidewall and an adjustment bolt made operative with a clamp assembly.

Still another object of the instant invention is to provide a guide track and reel housing clamp assembly for securely attaching the reel housing and guide tracks to the truck bed without drilling holes or otherwise damaging the integrity of the truck exterior finish, while hidden from normal view.

In accordance with these and other objects which will be apparent hereinafter, the instant invention will now be described with particular reference to the accompanying drawings.

PREFERRED EMBODIMENT OF THE INVENTION

Figure 1:
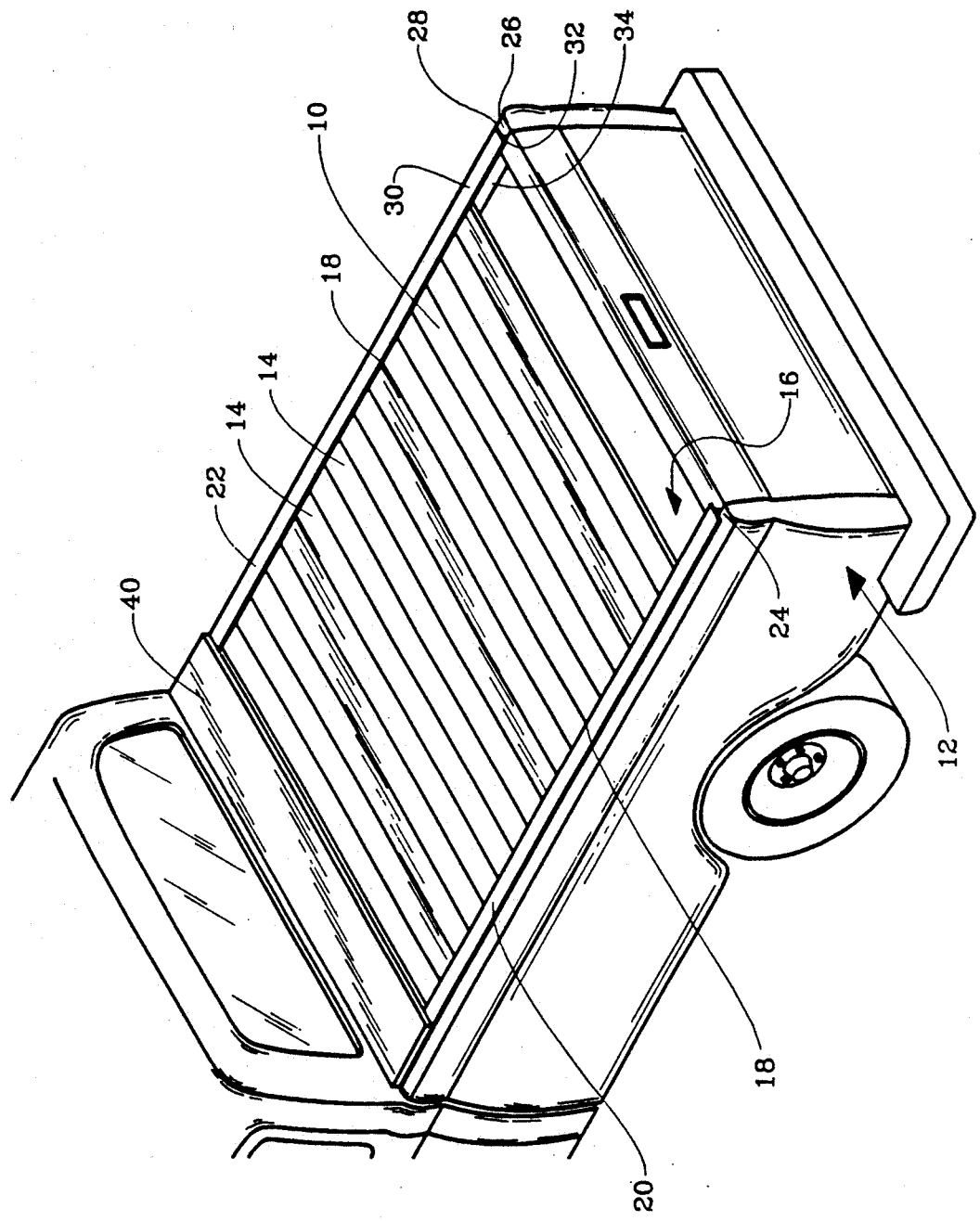
FIG. 1 is a perspective view of a truck bed cover in accordance with the invention installed onto a conventional pickup truck utility bed.
Figure 2:
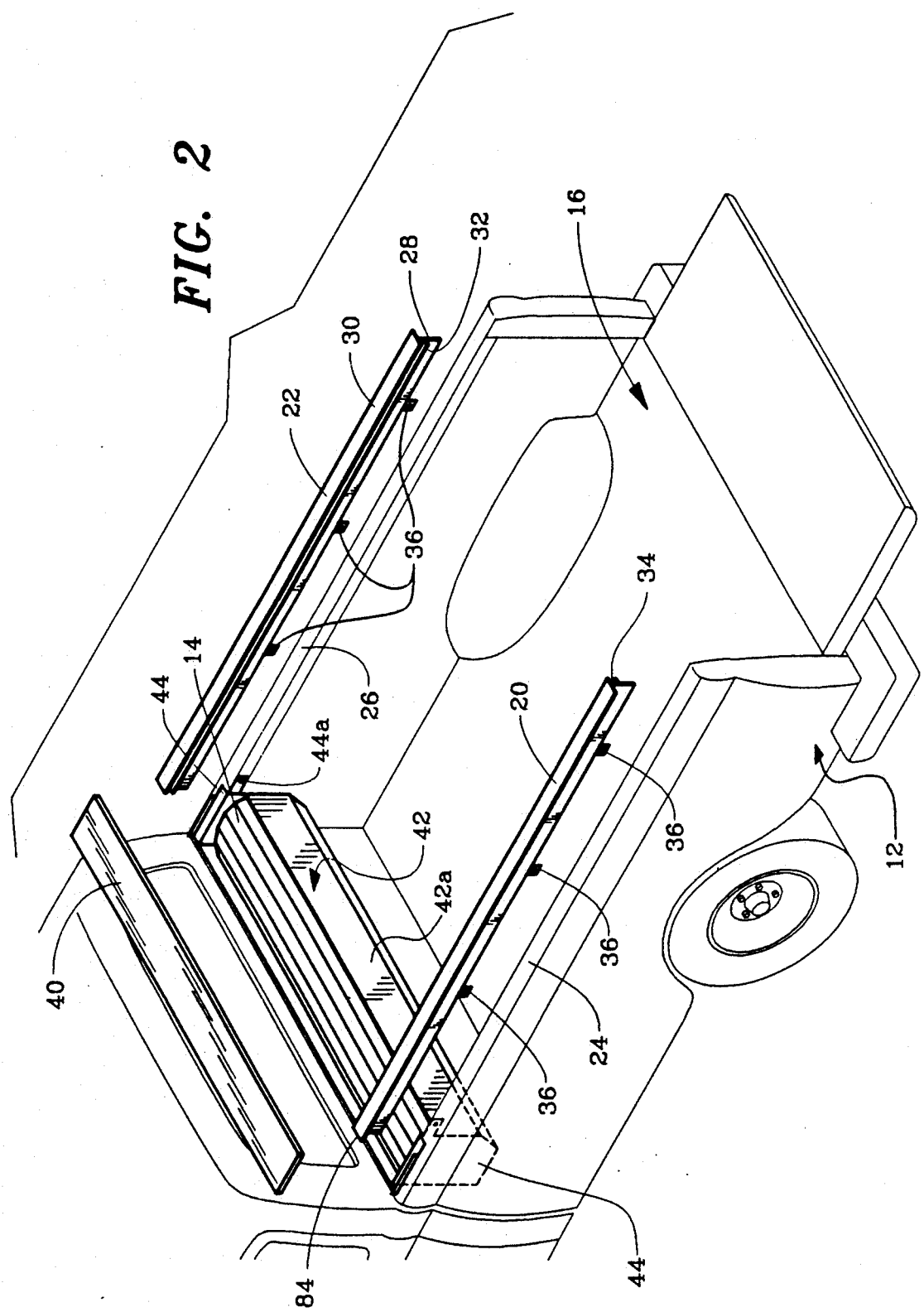
FIG. 2 is an exploded view of the invention's guide tracks and reel housing relative to the truck utility bed.

Referring now to the drawings and specifically FIGS. 1 and 2, the invention is shown installed upon an existing conventional pickup truck 12, the rolling cover body 10 having a plurality of metal or plastic slats 14 which extend laterally across the utility pickup truck bed 16 and are interconnected in a side by side array along their lateral edges 18 so as to form a rollable bed cover. Each slat 14 has a flexible seal mounted within a hinge interconnection to prevent water, dirt, or dust from entering into the truck bed 16. A first guide track 20 and a second guide track 22 are disposed in parallel relation to one another for mounting on the outboard truck bed rails 24 and 26, respectively. Each guide track 20 and 22 is attached to the truck by a plurality of clamping elements 36 which secure each guide track to its respective bed rail as described in detail below. The cover body 10 can be rolled up and stored in reel housing 42 (shown in FIG. 2) that includes a top or lid 40 that is secured permanently over the reel housing 42. The reel housing 42 includes and is mounted to the truck bed by reel end support plates 44 and a clamping system. As shown in FIG. 2, each guide track 20 and 22 and the reel housing 42 which stores the cover body 10 rolled around a reel, are secured to the truck bed by a series of clamps and brackets which allow the entire cover body 10, the guide tracks 20 and 22 and the reel housing 42 to be securely attached to the utility truck bed 16 without structurally modifying the truck bed rails. In FIG. 2, the clamping system is represented by attaching clamps 36 shown along the bottom of guide track 20 and guide track 22 and brackets 80 (FIGS. 7 and 8) relative to the reel housing 42. In operation, the cover body 10 moves with its slat ends being engaged in the guide tracks 20 and 22 allowing the cover body 10 to be moved from a stored position within the reel housing 42 (rolled up around the reel) to a closed truck bed position where the cover body 10 encloses the entire truck bed. The clamping system and brackets for holding the guide tracks and reel housing are described in greater detail below.

Figure 3:
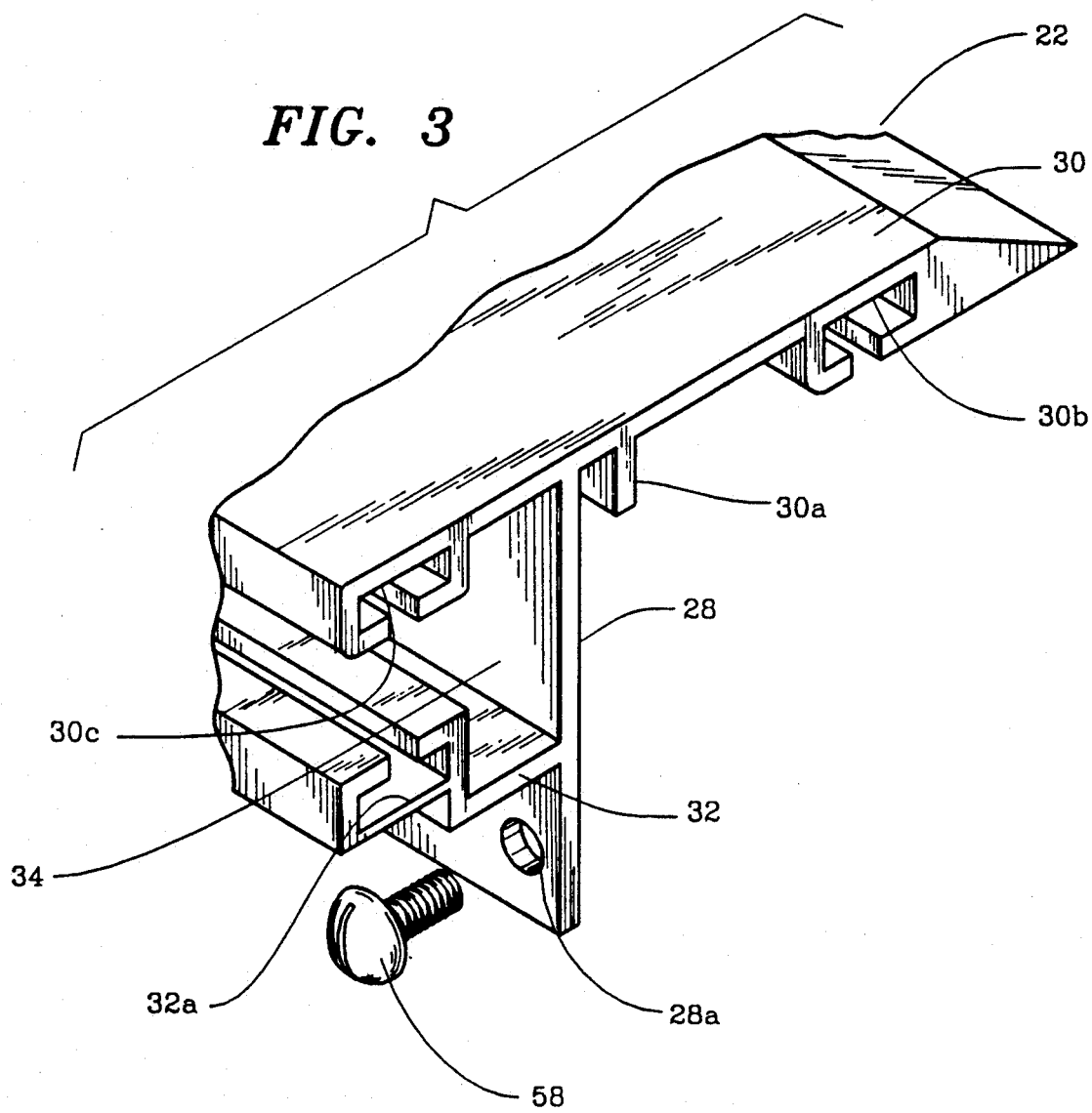
FIG. 3 is a perspective view partially cut away of a guide track used on one side of the truck bed in accordance with the present invention.

Referring to FIG. 3, a small segment of guide track 22 is shown. Each guide track 20 and 22 is identical and is formed from a rigid material such as aluminum. Each has a side wall 28, a top wall 30, and a bottom wall 32, said side wall 28 formed (extruded) integrally with said top wall 30 and bottom wall 32, forming a U-shaped passageway 34 with the opening when mounted facing the truck bed centerline, inwardly and substantially horizontal, facing the opposing guide track opening mounted on the opposite horizontal wall of the truck bed rail. The slat ends of the cover body 10 (FIG. 1) fit in the passageway 34. The guide rail as shown in FIG. 3 is structurally identical and is the same on each side of the bed rail of the truck. The top wall 30 includes a vertically flanged portion 30a facing downwardly that extends the length of the underside of wall 30. The purpose of flange 30a is to fit in a cooperating relationship with a groove or slot in the clamping system 36 (shown in FIG. 4) which includes a slot 70 that receives and interlocks the flange 30a for increased stability between the clamping system and the guide rail.

The upper wall 30 in FIG. 3 includes on one side a channel 30c disposed along one edge that is positioned facing channel 32a in wall segment 32, both of which channels 30c and 32a are identically sized and receive a resilient vinyl-like or vinyl material that act to provide a surface that contacts the cover body slat ends (not shown) for bearing purposes and to prevent vibration and rattles so that when contact is made with the cover slats 14, vibrational noise is minimal and the cover slats slide smoothly between the vinyl material disposed in channels 30c and 32a.

Upper wall 30 also includes another channel 30b which receives protective pad and sealing strip material so that the guide track can rest on the upper wall of the truck bed rail, to provide a snug fit and to prevent any damage to the upper exposed surface of the truck bed rail.

Wall 28 of the guide track includes a small aperture 28a near the bottom that is spaced at predetermined intervals along the guide track that receives a threaded fastener 58 that is used to attach one of the clamping members 64 (FIG. 4) to the guide track.

Figure 4:
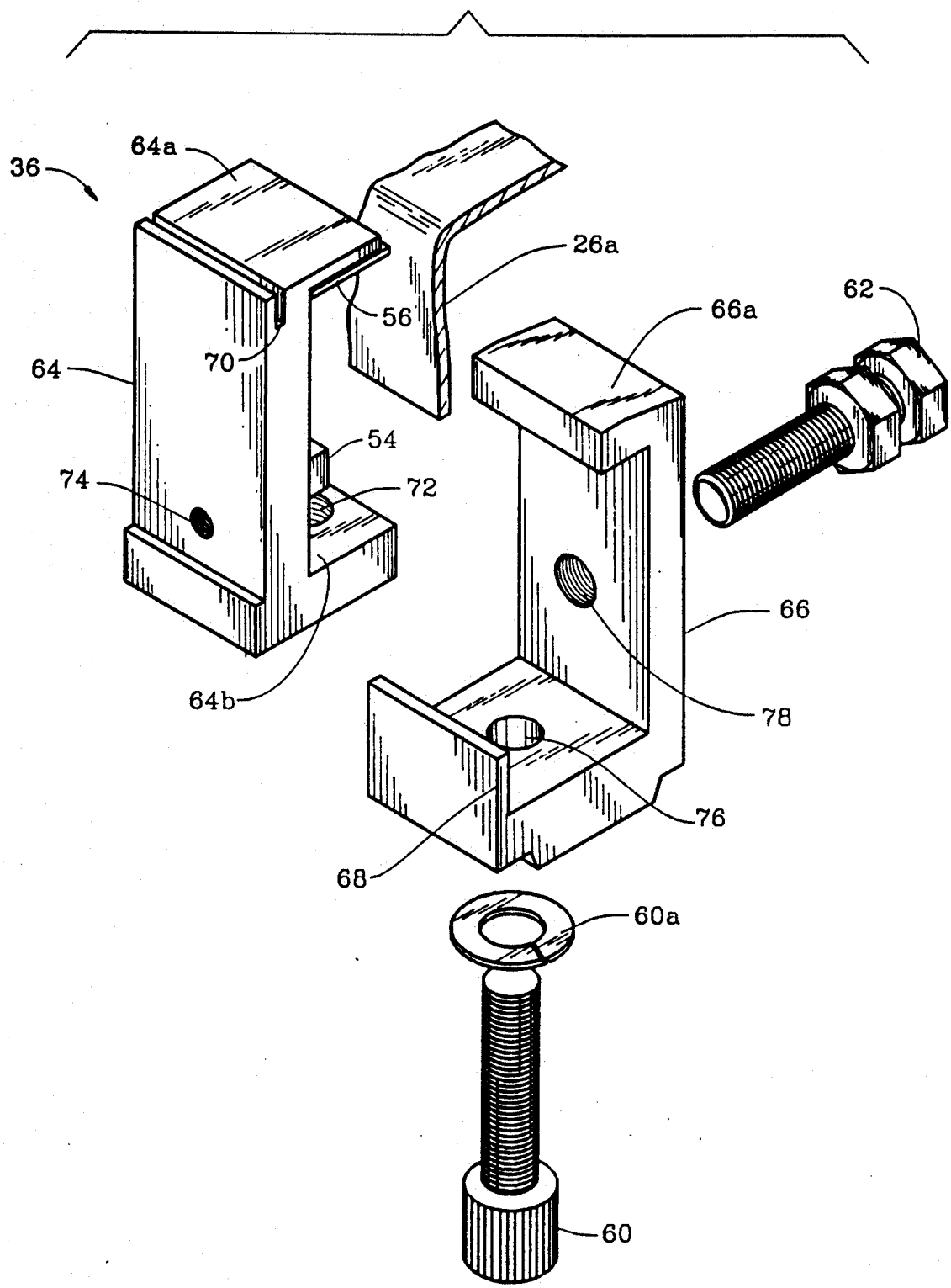
FIG. 4 shows a perspective view exploded of a clamp used in the present invention to clamp a guide rail to a portion of the truck bed rail in accordance with the present invention and partially showing a cutaway portion of a truck bed rail.
Figure 5:
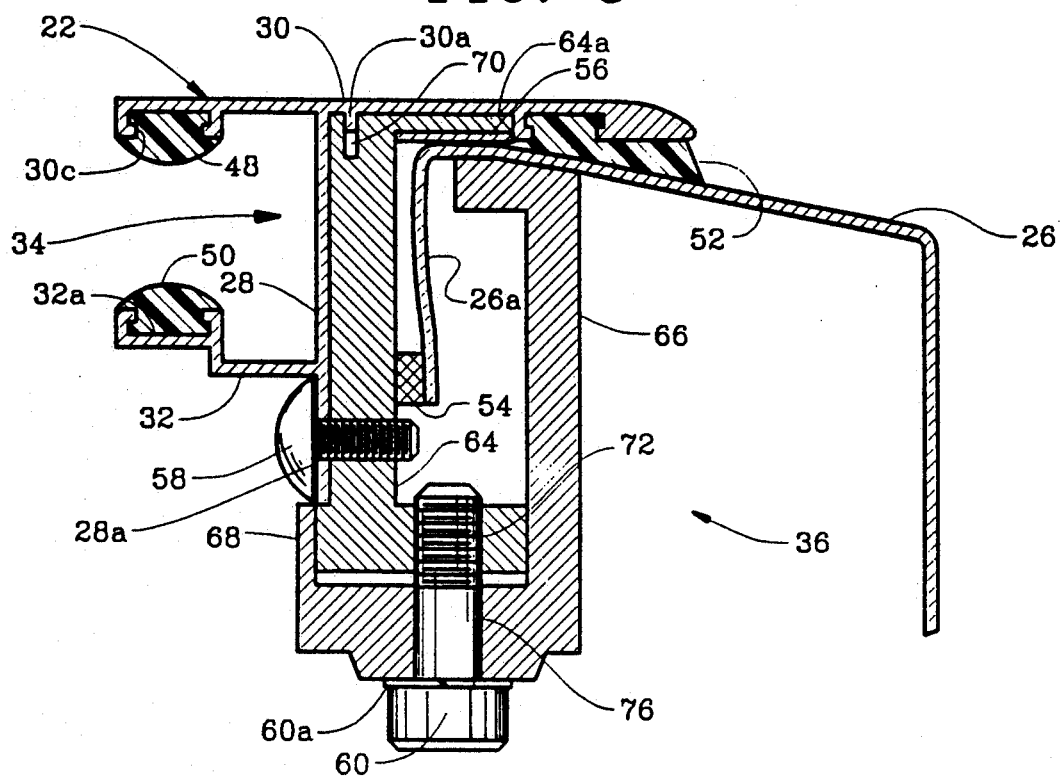
FIG. 5 shows an elevational view in cross section of the clamp structure shown in FIG. 4, the guide track shown in FIG. 3, and a portion of the truck bed rail on a direction looking from the rear of the truck toward the front of the truck.
Figure 6:
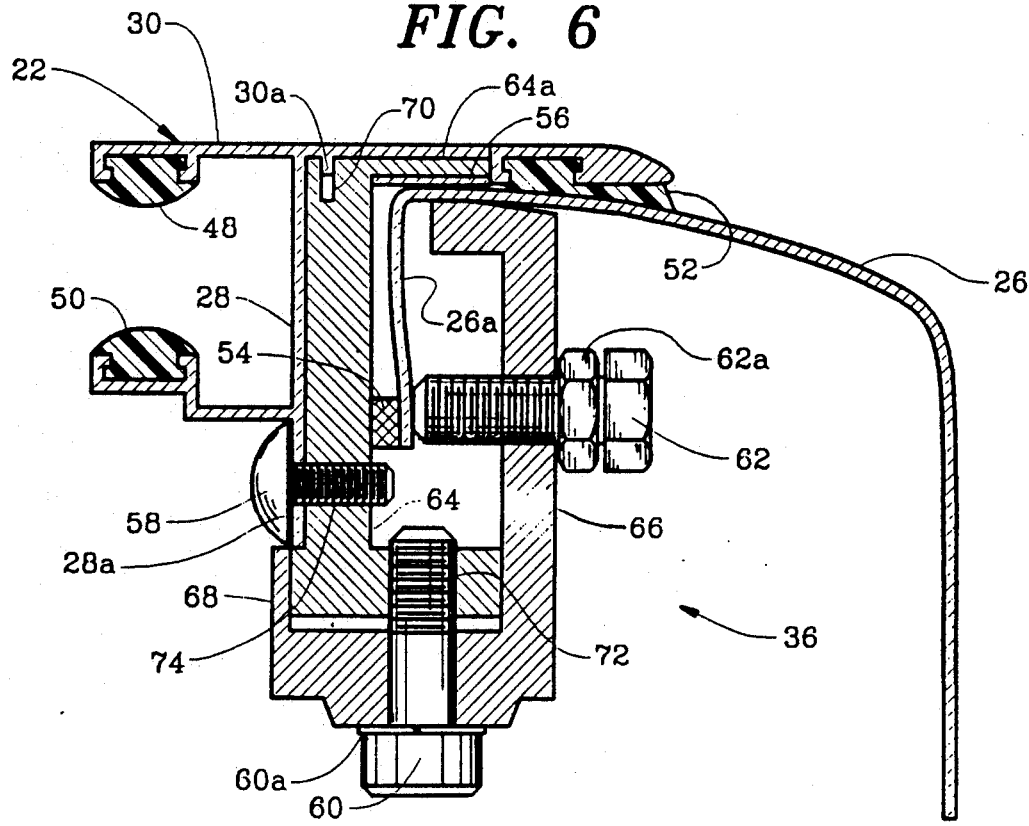
FIG. 6 shows an elevational view in cross section as in FIG. 5 with the addition of the adjusting bolt for clamping the guide track to a truck bed rail.

FIG. 4 shows the clamping system 36 which is comprised of two C-shaped clamp elements 64 and 66 which are mounted and connected in the operating position in an interlocking relationship facing each other, juxtaposed with the lip of the truck bed rail 26a firmly connected to the clamping elements 64 and 66, with the clamping element 64 being attached to the guide track through aperture 28a (non-threaded) that receives the threaded screw or threaded fastener 58 (shown in FIG. 3) connected into threaded aperture 74 in clamp element 64. FIGS. 4, 5 and 6 address the clamping system specifically used for the guide tracks. The forward ends of the guide tracks 20 and 22 are also attached to the reel housing 42 which includes its own brackets and is discussed in greater detail below.

FIG. 5 shows one embodiment of the invention wherein the clamping elements 64 and 66 are shown in an interlocking position with the lower base wall of clamping element 66 including a vertical wall 68 that receives the base of clamp element 64 in addition to a threaded bolt 60 and lock washer 60a with the threaded bolt 60 being firmly fastened to a threaded aperture 72 in the lower base wall of clamping element 64, thus fastening together clamp element 66 to clamp element 64 against the truck bed rail 26 wall portion. The clamping element 64 includes a top wall 64a that has beneath it a rubber pad 56 that contacts the upper wall of the truck bed rail 26 in the clamping position. Clamping element 64 also includes a slot 70 that receives a flange 30a in the bottom side of the guide track wall 30. The clamp element 64 also includes another rubber pad 54 strategically located approximately midway on the inside C-shaped wall which faces outward which also contacts the bed rail wall 26a to provide a biasing force in conjunction with pad 56.

FIG. 5 also shows flexible vinyl or vinyl-like material runners 48 and 50 mounted respectively in channels 30c and 32a. Thus, as shown in the embodiment of FIG. 5, the guide track 22 which receives one end of the slatted cover body 10 (FIG. 1) within channel 34, is firmly attached to the truck bed rail 26 and the extended lip of the truck bed rail 26a through the action of bolt 60 and threaded fastener 58 and the interlocking clamping elements 64 and 66.

Referring now to FIG. 6, another embodiment of the clamping system for the guide track 22 is shown which is substantially identical to the embodiment shown in FIG. 5 with the addition of a bolt threaded connector 62, having a locking nut 62a, which further ensures the stability of the guide track 22 and allows for adjustment by allowing the threaded bolt 62 to apply biasing pressure and tension against the pad 54, firmly holding the entire clamp 36 in place against the truck bed rail lip 26a.

In order to mount the guide tracks 20 and 22 to the bed rails 24 and 26, three or four clamps 36 are disposed on each side of the truck bed. These clamps 36 would be spaced along each truck side wall, substantially equally spaced from the rear to the front of the truck bed on each side. It is clear from FIGS. 4, 5 and 6 that the guide tracks 20 and 22 can be readily connected to the truck bed rails by adjusting one or two bolts and tensioning those bolts relative to the truck bed rail which results in the guide tracks 20 and 22 being securely connected to the truck bed rail with no structural modifications (such as drilled holes) required in the truck bed rail.

Figure 7:
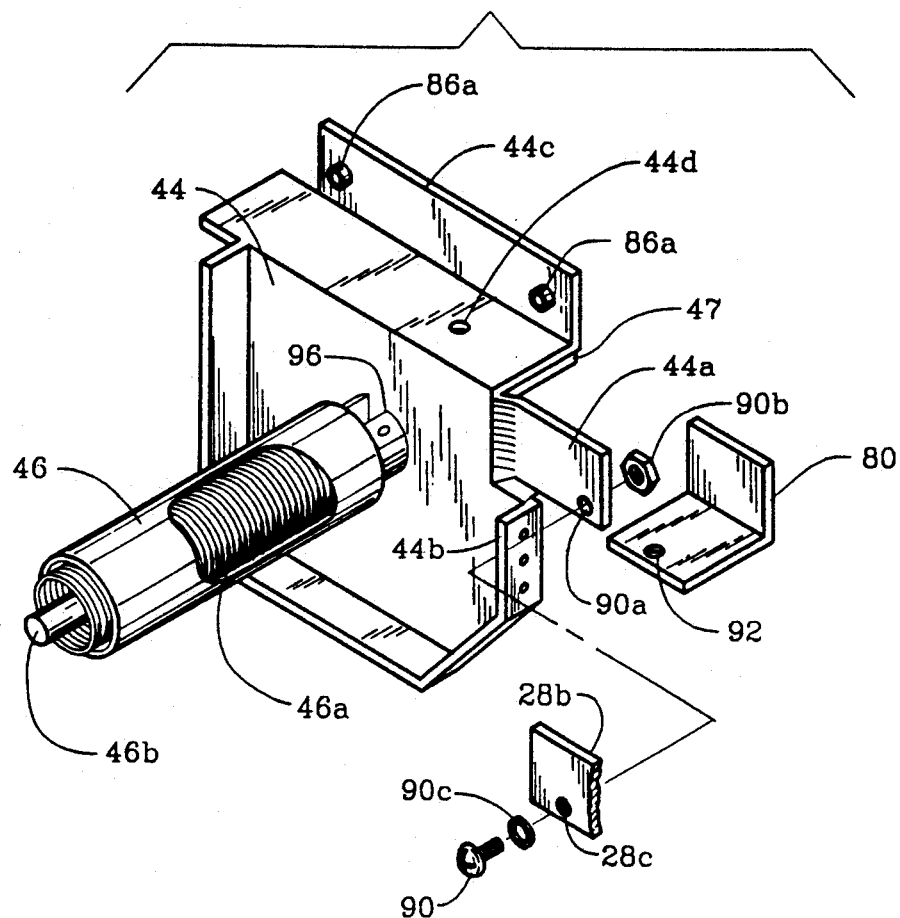
FIG. 7 shows a perspective view of one of the reel support end plates, a cutaway view of the reel, and a portion of the reel housing that is attached by brackets to a portion of the bed rail of the truck.

In addition to mounting guide tracks to the truck bed rails, the rolling cover body must have a suitable storage housing when the bed is open. The reel housing includes a rigid reel that is spring actuated that allows the cover body 10 to be rolled up in a convenient storage area disposed against the forward end wall of the utility pickup truck bed. In FIG. 7, the truck guide tracks 20 and 22 each connect at their forward ends (truck front) by a threaded fastener to a pair of reel housing end support plates 44 which support the reel to which the cover is attached at one end on each side and which have a recessed flange so that the guide tracks 20 and 22 fit flush with the reel housing end support plates 44.

FIG. 7 shows reel 46 and end plate 44 which may be enclosed with walls made of sheet metal that enclose the reel and cover body when stored. The tubular rigid reel 46 has a spring 46a connected inside to spring fitting 96 and to rigid shaft 46b connected at each end by connector 88 to end plate 44. The spring 46a allows the cover to be retracted by spring action into the reel housing 42. As the reel 46 is rotated by manually removing the cover body 10 from the reel housing 42, spring 46a is tensioned as the cover body unrolls, storing potential energy to retract the cover body 10 when desired. The spring 46a action is similar to a conventional window shade and does not form part of the invention. Each end plate 44 is substantially flat and has a plurality of flanges, including flange 44a extending horizontally, a 90° flange wall 44b that is used to attach the end plate 44 to housing walls 42a and an upper L-shaped flange wall 44c having a rubber pad 47 adhesively attached that engages the top wall surface of the truck bed rail (the horizontal area portion) in conjunction with a bracket 80 to firmly attach the end plate reel housing support plate 44 to the bed rail 26. The housing lid 40 attaches to flange 44c with fastener 86 connected through aperture 40a.

Figure 8:
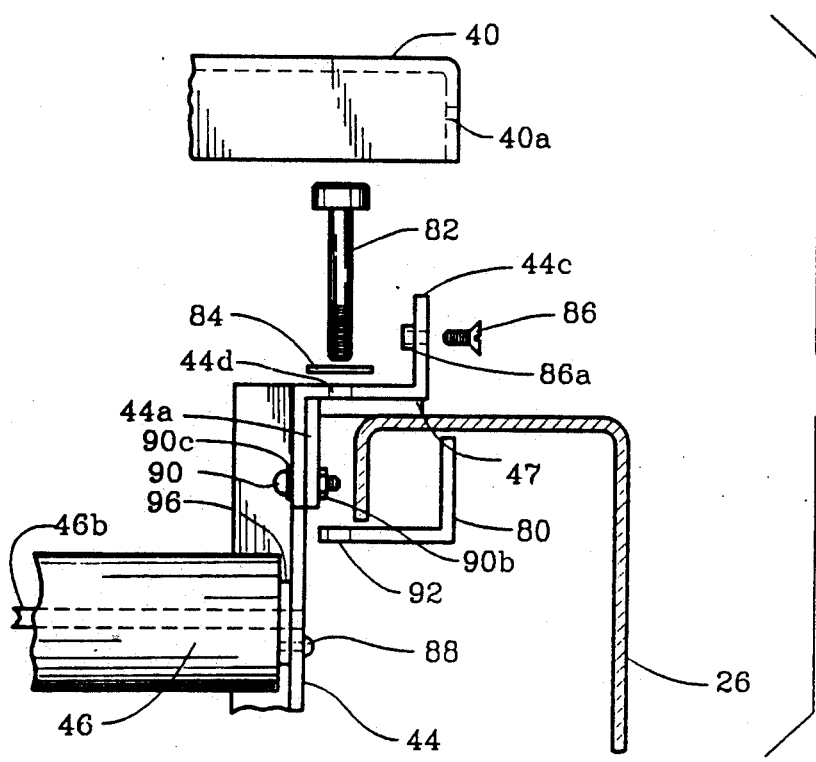
FIG. 8 shows an elevational view in cross section of the reel support end plate, the holding brackets for the reel support plate, the truck bed rail and the reel housing lid in accordance with the invention.

Referring now to FIG. 8, a bracket 80 is used to attach each reel housing end plate 44 to opposing truck bed rails 26 such that the rubber pad 47 adhesively attached to integral horizontal flange 44c contacts the upper surface of bed rail 26 in a horizontal area firmly resting on the bed rail. The bracket 80 (which is essentially L-shaped) receives bolt 82 and lock washer 84 in threaded aperture 92 firmly affixing the horizontal flange 44c through aperture 44d to bracket 80 clamping the reel housing end plate 44 firmly to the truck bed rail 26. In addition, a reel housing lid 40 (also shown in FIGS. 1 and 2) can be fastened by screws 86 attached to threaded bushings 86a mounted on a vertical portion of the flange 44c through aperture 40a so that it fits snugly, covering the entire cover body rolled about the reel in the reel housing 42. Note that both the bracket 80, which firmly attaches the end plate 44 to the bed rail, works in conjunction with the guide track vertical wall 28b so that guide tracks 20 and 22 are attached to the reel housing end support plates 44 flush at the recessed flange 44a so that the guide track wall 28b end corner fits in the offset or recessed portion of flange 44a and is fastened thereto through an aperture 90a and aperture 28c in precise alignment with nut 90b. Bracket 80 once connected to the end plate 44 and the truck bed rail is hidden from view while connecting bolt 82 is concealed by reel housing lid 40 for security and aesthetics. A threaded screw 88 fastens the spring fitting 96 to end plate 44 to prevent rotation and to firmly hold the spring fitting to the plate. Additional fasteners (not shown) are connected in a similar manner through apertures in the end plate 44 and into threaded apertures in the spring fitting 96.

The invention has been described to show how a rolling slatted cover for a one ton or smaller utility pickup truck bed can be quickly but securely attached to the truck bed without any structural modification to the truck bed. All attaching elements are hidden for security. The slatted rolling cover body can be conveniently stored in the reel housing which is firmly connected to the front end of the truck bed. The entire truck bed cover body, the reel housing, and the guide tracks could be removed if required when the truck is sold. The reel housing and the guide tracks are sized in width and length respectively to fit a conventional sized open bed pickup truck. Other larger or smaller bed trucks can be accommodated.

The invention has been shown and described herein in what is considered to be the most practical and preferred embodiment. It is recognized, however, that departures may be made therefrom within the scope of the invention and that obvious modifications will occur to a person skilled in the art.

What is claimed is:

1. An apparatus for covering a conventional pickup truck utility bed having a truck bed rail on opposing sides of said utility bed, each of said truck bed rails including a substantially horizontal portion having an upper surface and a lower surface comprising: a pair of elongated guide tracks having slat end passages disposed in parallel relation to one another, each guide track for mounting to an opposing truck bed rail of said conventional pickup truck utility bed; means for adjustably clamping said guide tracks to the truck bed rails without modifying said bed rails; a cover body including a plurality of elongated slats hingedly interconnected longitudinally, each slat having a first end and a second end sized for slidable engagement within said guide tracks slat end passages and operatively associated therewith; and, an enclosure means including a cover body storage reel for receiving said cover body located in an operable position relative to said guide tracks, said cover body being stored in said enclosure means by winding about said storage reel, said adjustable clamping means including a means for removably coupling said clamping means to said truck bed rails mounted below said truck bed rail, and being inaccessible, whenever said cover body extends over said utility bed.

2. The apparatus of claim 1, including: means for adjustably connecting said enclosure means to said truck bed.

3. The apparatus of claim 2, including: means for adjustably connecting said enclosure means to said truck bed rail.

4. The apparatus of claim 1, including: means for adjustably clamping said guide tracks to the upper surface and lower surface of each truck bed rail.

5. The apparatus of claim 1, wherein: said adjustable clamping means includes first and second interlockable adjustable members which engage the upper and lower surfaces of said bed rail and a means for adjustably connecting said interlockable members together relative to said truck bed.

6. The apparatus according to claim 1 wherein said guide tracks are each formed from a single elongated support having an upper wall placed in a substantially horizontal position over the upper surface of the utility bed rail, an inner wall centrally disposed and perpendicular to the top wall, and a bottom wall made integral with said inner wall; said top, inner, and bottom walls forming said slat end passage along the length of said track, said guide tracks being attached to said clamping means.

7. The apparatus according to claim 6 wherein said upper wall of said guide track includes a downward facing runner gripping flange placed in the U-shaped passageway for the insertion of a resilient runner.

8. The apparatus according to claim 6 wherein said bottom wall of said guide track includes an upward facing runner gripping flange place in the U-shaped passageway for the insertion of a resilient runner, said upward facing runner gripping flange diametrically opposed to said downward facing runner gripping flange.

9. The apparatus according to claim 6 wherein said upper wall of said guide track includes a means for securing a gasket sealing said upper wall to the utility bed rail upper surface.

10. The apparatus according to claim 1 wherein said means for adjustably clamping said guide tracks to said bed rails comprises first and second clamp elements, each attachable to said guide track and to said truck bed rail upper surface and said truck bed rail lower surface to prevent rotational movement of said clamping means.

11. The apparatus according to claim 9 wherein said clamping means includes adjusting means for aligning said guide track in a substantially horizontal plane.

12. The apparatus according to claim 10 wherein said adjusting means for aligning said guide track is an adjustment bolt having at least one locking nut.

13. The apparatus according to claim 12, wherein: said first and second clamp elements attachable to said guide track includes:
said first clamping element being substantially C-shaped, and said second clamping element being substantially C-shaped, wherein said first clamping element can fit within said second clamping element.

14. An apparatus providing a roll up cover for a pickup truck utility bed having a bed rail on each side of said utility bed comprising: a pair of elongated guide tracks disposed in parallel relation to one another for mounting on the bed rail of a conventional pickup truck utility bed, each guide track having a top wall placed in a substantially horizontal position over the top surface of the utility bed rail, an inner wall centrally disposed and perpendicular to the top wall having a plurality of mounting holes placed therethrough, and a bottom wall made integral with said inner wall forming a U-shaped passageway; means for securing guide tracks to said clamping means through said mounting holes; a roller cover formed of a plurality of elongated rectangular slats hingedly interconnected movably at each end in said guide tracks; adjustable clamping means for clamping said guide tracks to said truck bed rail; and a cover housing adjustably connectable to said truck bed rails.

15. An apparatus as in claim 14, including: said cover housing including a pair of end plates, each of said end plates including a resilient pad that engages said utility bed, and bracket means for clamping said end plate to said truck bed.

* * * * *